April 8, 1952 H. O. ENGSTROM 2,592,128

METHOD OF MAKING A SELF-LOCKING NUT

Filed Jan. 23, 1947 3 Sheets-Sheet 1

INVENTOR
HENRY O. ENGSTROM
BY
George T. Gill
ATTORNEY

April 8, 1952 H. O. ENGSTROM 2,592,128
METHOD OF MAKING A SELF-LOCKING NUT
Filed Jan. 23, 1947 3 Sheets-Sheet 2

INVENTOR
HENRY O. ENGSTROM
BY
ATTORNEY

April 8, 1952     H. O. ENGSTROM     2,592,128
METHOD OF MAKING A SELF-LOCKING NUT Filed Jan. 23, 1947     3 Sheets-Sheet 3

INVENTOR
HENRY O. ENGSTROM
BY
George F. Gill
ATTORNEY

Patented Apr. 8, 1952

2,592,128

UNITED STATES PATENT OFFICE 2,592,128

METHOD OF MAKING A SELF-LOCKING NUT

Henry O. Engstrom, Southport, Conn., assignor to Richard W. Luce, Southport, Conn.

Application January 23, 1947, Serial No. 723,878

1 Claim. (Cl. 10—86)

The invention herein disclosed relates to a method of making self-locking nuts. More particularly, the invention relates to a self-locking nut comparable to that disclosed in my copending applications Serial Nos. 651,245 and 722,939, now Patent 2,580,745, issued January 1, 1952, filed respectively March 1, 1946, and January 18, 1947, for Self-Locking Nut.

An object of this invention is to provide a self-locking nut of the kind mentioned in which the locking portions have greater resiliency. Another object of the invention is to provide a self-locking nut of this kind in which the locking portions are thinner than the portions of the nut on both sides thereof. A further object of the invention is to provide a self-locking nut of this kind which is comparatively inexpensive and which meets exacting specifications. An additional object of the invention is to provide a method of making self-locking nuts of this kind by which the nuts may be manufactured economically.

The foregoing objects and certain advantages that will hereinafter appear are realized in the self-locking nut illustrated in the accompanying drawing and the method of making lock-nuts described below.

Figure 1:
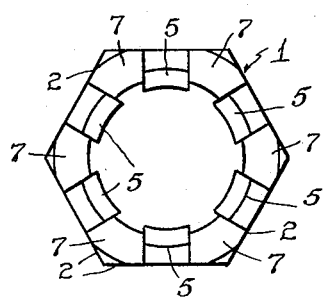
Figure 2:
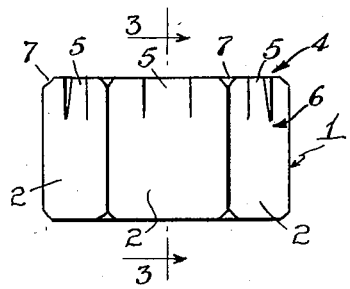
Figure 3:
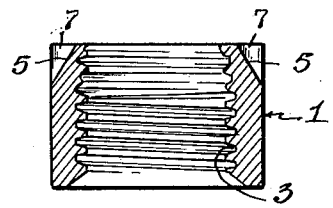
Figure 4:
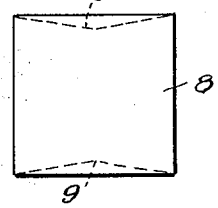
Figure 5:
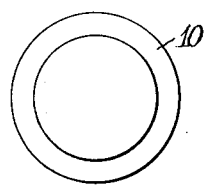
Figure 6:
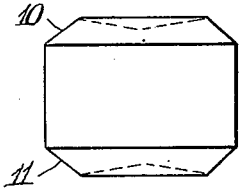
Figure 7:
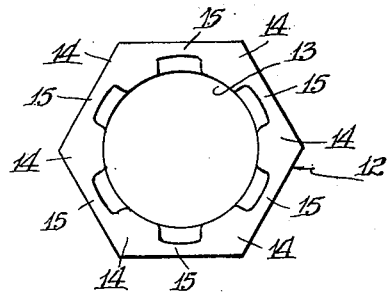
Figure 8:
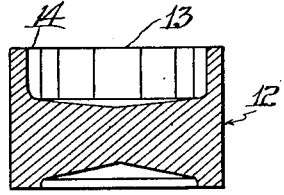
Figure 9:
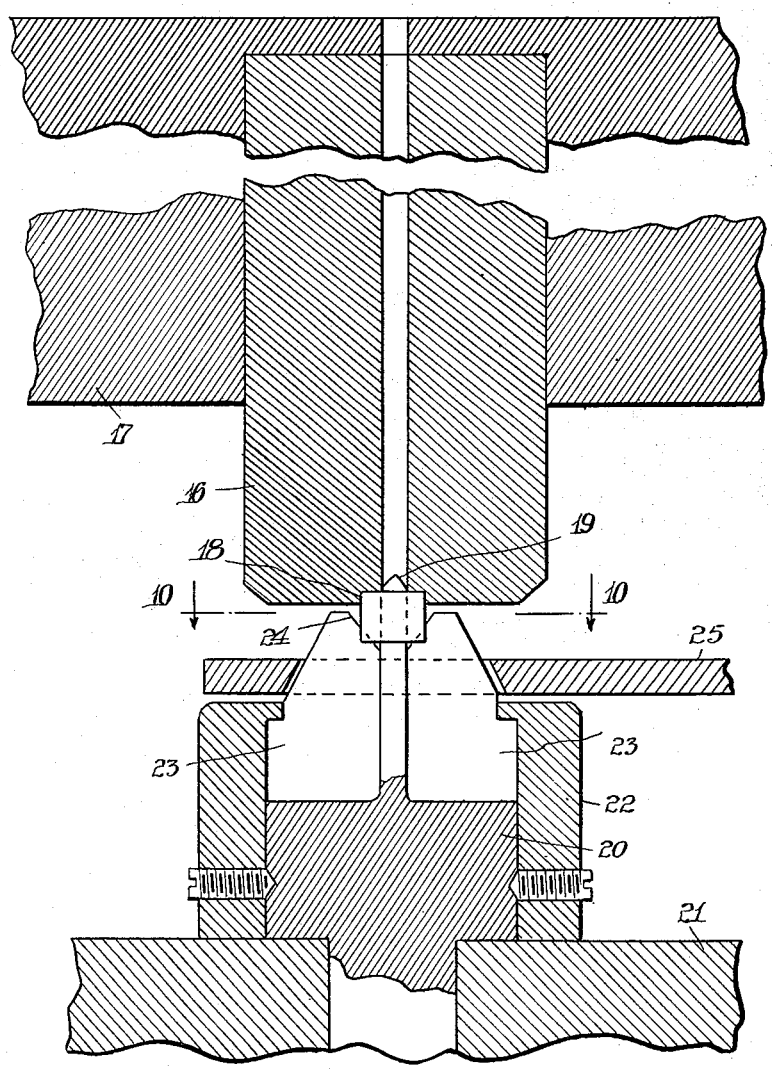
Figure 10:
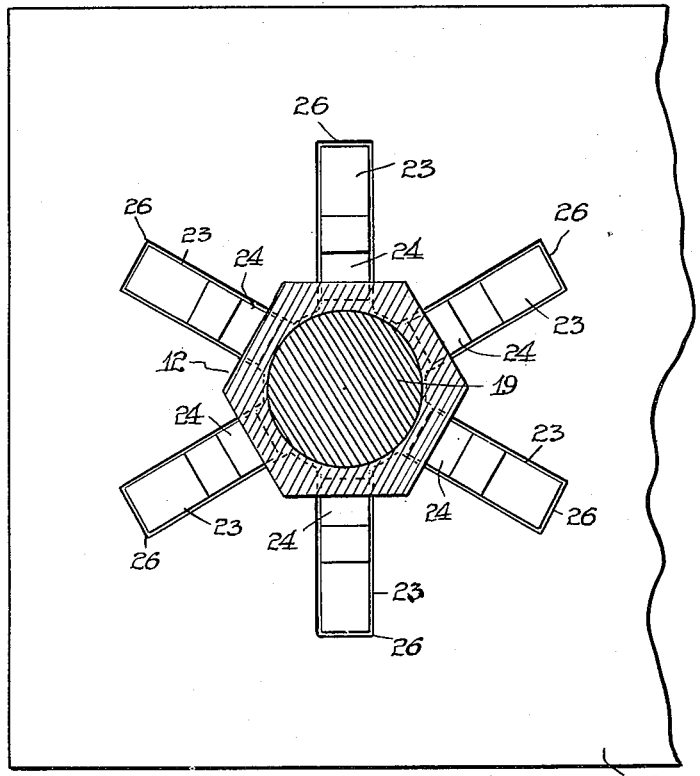
Figure 11:
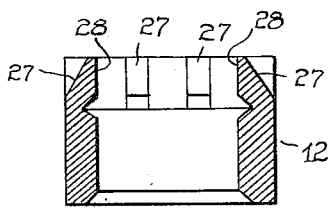

The drawings include:

Fig. 1 which is a plan of a lock nut embodying the invention;

Fig. 2 which is an elevation of the same;

Fig. 3 which is an axial sectional elevation of the same taken on the line 3—3 of Fig. 2;

Fig. 4 which is an elevation of a solid cylindrical slug cut from a wire and with the ends squared and centered;

Fig. 5 which is a plan of the slug after being operated upon;

Fig. 6 which is an elevation of the same;

Fig. 7 which is a plan of a partially formed nut blank drawn from the formed slug shown in Figs. 5 and 6;

Fig. 8 which is a sectional elevation of the partially formed blank;

Fig. 9 which is a fragmentary, sectional plan of the final operation on the nut blank prior to tapping;

Fig. 10 which is a sectional elevation of the same taken on the line 10—10 of Fig. 9; and Fig. 11 which is an axial sectional elevation of a nut blank before tapping.

The self-locking nut 1 illustrated in Figs. 1 to 3 of the drawing is of conventional hexagonal outer configuration to provide six wrench faces 2, although it will be understood that the outer configuration may partake of any form. The nut has an axial bore therethrough and a thread 3 therein. At one end of the nut, there is a locking section 4, constituting a portion of the nut.

The locking section includes a plurality of inwardly extending resilient tangs 5 extending from the end of the nut body to a point or plane 6 intermediate the ends of the nut. The tangs are thinner than the wall sections 7 on each side thereof, which are of equal thickness with the wall of the nut. The inner surfaces of the tangs are threaded as are also the inner surfaces of the sections 7. In addition, the tangs are inwardly bent so that normally, the thread portions on the inner surfaces thereof extend inwardly somewhat beyond the normal diameter of the thread of the nut.

As a bolt is threaded through the nut, it engages the inwardly extending threaded tangs. Because of the fact that the tangs extend inwardly from the outer surface of the nut, they constitute an inwardly and slightly downward extending resilient threaded portion constituting a portion of the nut. When engaged by the bolt, they effect an inward and axial force resulting in a frictional engagement between the surfaces of the threads of the nut and the bolt. The axial force tends to take-up the thread tolerance between the threads of the nut and bolt to effect a frictional engagement between the thread 3 in the nut body and the thread of the bolt. This force is in the same direction as the axial force exerted when the nut is drawn home on the bolt against an abutment.

In view of the fact that the sections 7 on each side of the tangs are threaded, the nut has in effect a continuous thread. The pull strength of the nut is thus not substantially reduced. The locking action effected is sufficient to resist loosening of the nut under the forces resulting from vibration ordinarily encountered in service.

The nut described above may be comparatively inexpensively manufactured in accordance with the method of this invention. Certain of the steps of the method are disclosed in Figs. 4 to 9 of the drawings. In the first instance, a slug 8, constituting a piece of round wire, is cut from the end of a wire. The ends of the slug are squared and centering depressions or countersinks 9 are formed in the end faces so that the slug is as illustrated in Fig. 4, round in cross section. Next the slug is partly flattened and domed at each end as shown at 10 and 11, Figs. 5 and 6. Thereafter, the slug is drawn into a partially formed nut blank 12 as shown in Figs. 7 and 8.

The blank shown in Figs. 7 and 8 has a hollow end portion 13. The wall of the hollow end portion 13 is of different thickness including alternate thick portions 14 and thin portions 15. The thick portions 14 are of the same thickness as the wall of the finished nut blank and the thinner portions 15 form the tangs.

In the next operation (Fig. 9) the nut blank is pierced and simultaneously the thin portions 15 are sheared longitudinally at each side thereof, bent inwardly and the inner surfaces flattened against the punch which acts as a mandrel. The arrangement for effecting this operation is illustrated in Figs. 9 and 10. A die 16 is secured in the bed plate 17 of a header. The die has a hexagonal recess 18 therein in which the nut blank 12 is received. A piercing tool 19 extends from a plunger 20 mounted in a movable plate 21 of the header. Secured to the plunger, there is a fixture 22 which holds six shearing plates 23 angularly spaced about the shank of the piercing tool 19. The shearing plates have inclined shearing surfaces 24. A stationary stripper plate 25 having slots 26 for the shearing plates serves to strip the nut blank from the piercing tool.

In operation, the nut blank 12 is inserted in the recess 18 while the movable plate 21 of the header is retracted. Upon forward movement, the piercing tool 19 pierces the nut blank to form the axial bore therethrough. Upon further movement, the inclined shearing surfaces 24 of the shearing plates 23 engage the six thin wall portions 15, shear these portions along each side thereof, bend the sheared tangs inwardly and flatten the inner surfaces against the shank of the piercing tool which acts as a mandrel. Upon return movement, the nut blank is carried on the piercing tool until it engages the stripper plate which strips it from the piercing tool. The result is a nut blank as shown in Fig. 11 in which the tangs 27 are gradually thinned toward the free end thereof and the inner surfaces 28 are flattened and in line with the inner wall of the nut. The foregoing operations are performed on a header continuously and successively.

The blank so formed is then tapped, the thread being cut in the inner surfaces of the tangs as well as the rest of the nut. After the nut is tapped, the tangs are again bent inwardly to position the thread thereon inwardly beyond the normal diameter of the thread of the nut and slightly downwardly.

From the foregoing description of the lock nut illustrated in the drawing and the method of making lock nuts described above, it will be apparent to those skilled in the art that by this invention there is provided an effective, reusable lock nut that is comparatively inexpensive to manufacture.

It will be obvious that various changes may be made by those skilled in the art in the details of the lock nut illustrated in the drawing, and the steps of the method described above within the principle and scope of the invention as expressed in the appended claim.

I claim:

The method of making a self-locking nut of the kind described which method includes the steps of forming a nut blank with an axial bore therethrough, forming axially extending slots in the wall of said bore at one end of said blank, shearing the nut blank at spaced planes longitudinally of the nut blank from the slotted end thereof to a point intermediate the ends thereof by pressing the metal at said slots inwardly substantially to the diameter of said bore, tapping the nut blank, and thereafter pressing the inwardly pressed portion inwardly beyond the diameter of said tapped bore.

HENRY O. ENGSTROM.

REFERENCES CITED

The following references are of record in the file of this patent:

UNITED STATES PATENTS

| Number | Name | Date |
| --- | --- | --- |
| Re. 22,243 | Gade | Jan. 5, 1943 |
| 370,559 | Redmond | Sept. 27, 1887 |
| 1,408,917 | Wilcox | Mar. 7, 1922 |
| 1,903,921 | Rupf | Apr. 18, 1933 |
| 1,977,162 | Wilcox | Oct. 16, 1934 |
| 2,087,053 | Stoll | July 13, 1937 |
| 2,258,181 | Hinds | Oct. 7, 1941 |
| 2,349,513 | Mortus | May 23, 1944 |
| 2,381,110 | Chandler | Aug. 7, 1945 |
| 2,381,111 | Chandler | Aug. 7, 1945 |
| 2,391,902 | Hoskin | Jan. 1, 1946 |
| 2,429,832 | Luce | Oct. 28, 1947 |

FOREIGN PATENTS

| Number | Country | Date |
| --- | --- | --- |
| 545,484 | Great Britain | May 28, 1942 |
| 580,325 | Great Britain | Sept. 4, 1946 |
| 810,417 | France | Dec. 28, 1936 |